US010606751B2

(12) United States Patent
Cunningham et al.

(10) Patent No.: US 10,606,751 B2
(45) Date of Patent: Mar. 31, 2020

(54) TECHNIQUES FOR CACHE DELIVERY

(71) Applicant: INTEL CORPORATION, Santa Clara, CA (US)

(72) Inventors: Andrew Cunningham, Ennis (IE); Mark D. Gray, Shannon (IE); Alexander Leckey, Kilcock (IE); Chris MacNamara, Limerick (IE); Stephen T. Palermo, Chandler, AZ (US); Pierre Laurent, Quin (IE); Niall D. McDonnell, Limerick (IE); Tomasz Kantecki, Ennis (IE); Patrick Fleming, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 8 days.

(21) Appl. No.: 15/201,348

(22) Filed: Jul. 1, 2016

(65) Prior Publication Data
US 2018/0004662 A1 Jan. 4, 2018

(51) Int. Cl.
*G06F 12/0811* (2016.01)
*G06F 12/0831* (2016.01)

(52) U.S. Cl.
CPC ...... *G06F 12/0811* (2013.01); *G06F 12/0831* (2013.01); *G06F 2212/283* (2013.01); *G06F 2212/621* (2013.01)

(58) Field of Classification Search
CPC ............. G06F 12/0811; G06F 12/0831; G06F 2212/283; G06F 2212/621
See application file for complete search history.

(56) References Cited

U.S. PATENT DOCUMENTS

| | | | | |
|---|---|---|---|---|
| 2008/0313420 A1* | 12/2008 | Beckmann | .......... | G06F 12/1054 711/207 |
| 2010/0064108 A1* | 3/2010 | Harris | ................. | G06F 12/0831 711/146 |
| 2013/0311706 A1* | 11/2013 | Okada | ................. | G06F 13/1694 711/103 |
| 2014/0181394 A1* | 6/2014 | Hum | ................... | G06F 12/0824 711/108 |
| 2015/0067433 A1* | 3/2015 | Wagh | ................. | G06F 13/1631 714/748 |
| 2015/0180782 A1* | 6/2015 | Rimmer | ................. | H04L 69/22 370/236 |

* cited by examiner

*Primary Examiner* — Tuan V Thai
*Assistant Examiner* — Alexander J Yoon

(57) ABSTRACT

An input/output (I/O) device arranged to receive an information element including a payload, determine control information from the information element, classify the information element based on the control information, and issue a write to one of a plurality of computer-readable media based on the classification of the information element, the write to cause the payload to be written to the one of the plurality of computer-readable media.

24 Claims, 11 Drawing Sheets

*FIG. 8*

Storage Medium 800

*Computer Executable Instructions for 100*

*Computer Executable Instructions for 200*

*Computer Executable Instructions for 300*

*Computer Executable Instructions for 400*

*Computer Executable Instructions for 500*

*Computer Executable Instructions for 600*

*Computer Executable Instructions for 700*

TECHNIQUES FOR CACHE DELIVERY

BACKGROUND

In computing, a cache is a component that stores data so future requests for that data can be served faster. For example, data stored in cache might be the result of an earlier computation, or the duplicate of data stored elsewhere. In general, a cache hit can occur when the requested data is found in cache, while a cache miss can occur when the requested data is not found in the cache. Cache hits are served by reading data from the cache, which typically is faster than recomputing a result or reading from a slower data store. Thus, an increase in efficiency can often be achieved by serving more requests from cache.

BRIEF DESCRIPTION OF THE DRAWINGS

FIG. 8 illustrates an embodiment of a storage medium.

DETAILED DESCRIPTION

Figure 1:
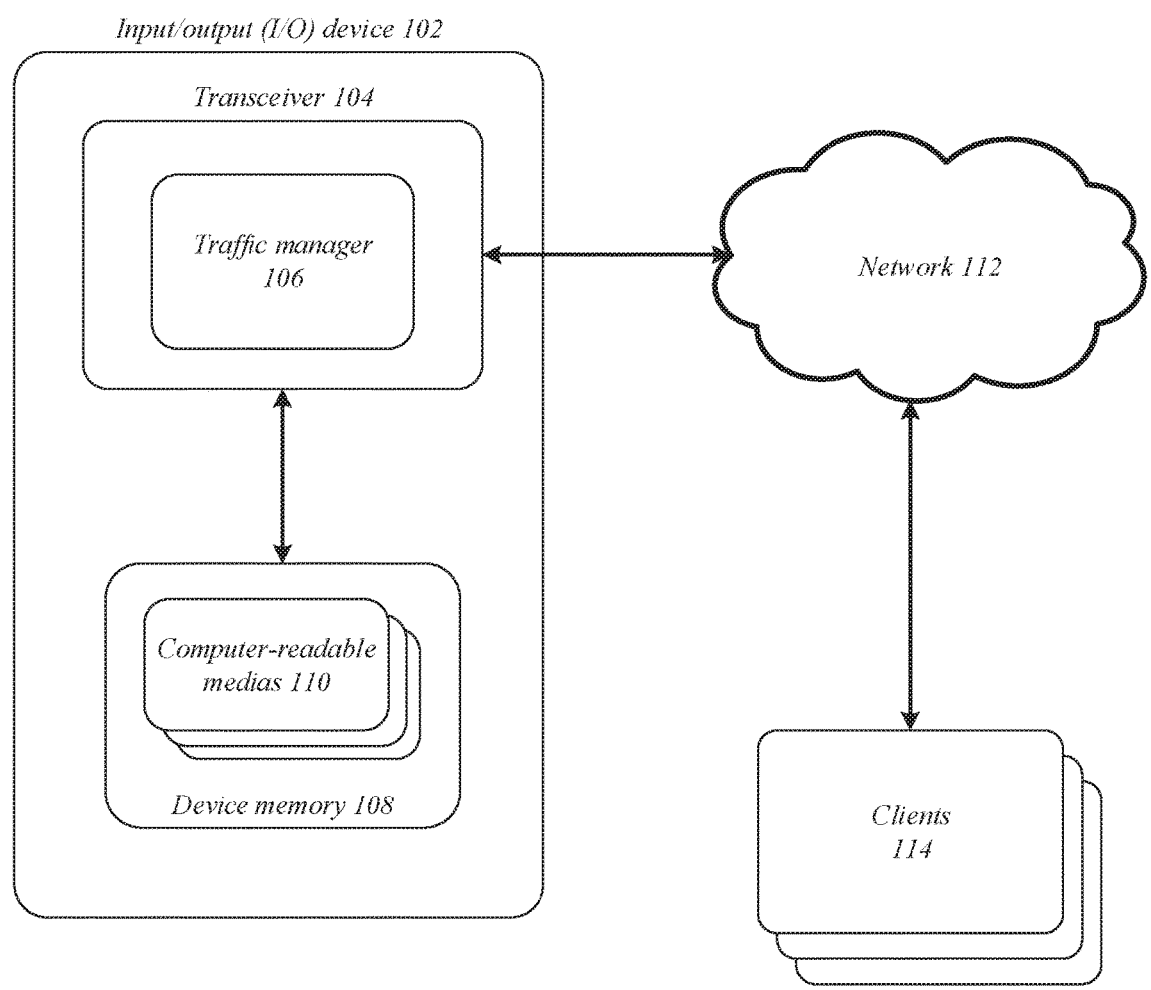
FIG. 1 illustrates an embodiment of a cache delivery system.

Various embodiments are generally directed to techniques for cache delivery. Some embodiments are particularly directed to a cache delivery system for handling information elements received over a network, such as, for instance, packets included in network traffic. Each information element may include control information (e.g., headers, trailers, descriptors, etc.) and payload data. Various embodiments described herein may use the control information of an information element to determine how to handle the information element. For instance, an input/output (I/O) device may decide whether to write a packet to cache memory or system memory and how to write the packet based on a Quality of Service (QoS) field in the packet header.

Some challenges facing cache delivery systems include efficient utilization of cache memory and maintaining low latency for traffic policies of QoS packet flows. For example, a cache may fill up due to inadequate processing resources causing a high priority packet which requires low latency processing to be evicted from a cache by a new lower priority packet. Cache evictions can lead to higher I/O latencies, as data accessed from system memory may be 3-4 times slower than data access from cache memory. Adding further to the complexity, care must be taken to ensure memory coherency as memory buffers are typically recycled within a system. These factors may result in increased latency and failure to meet traffic policies of QoS packet flows. Such limitations can drastically increase the cost and complexity of handling information elements, contributing to inefficient systems with reduced capabilities.

Some systems rely on memory buffer descriptors controlled by a static basic input/output system (BIOS) setting in a local computer system to determine whether to write an information element to system or cache memory. However, this may lead to a cache filling up due to inadequate processing resources, causing newly arriving packets to evict the oldest packet in the cache, even if the oldest packet in the cache has a higher priority (e.g., QoS traffic having low latency requirement). It is impractical and causes cache pollution when low priority information elements are allowed to evict higher priority information elements from a cache. Such techniques may entail needless complexity, high costs, and poor efficiency.

Various embodiments include a traffic manager to efficiently and accurately handle information elements received over a network. The traffic manager may extract a variable amount of control information from each information element to determine how to handle the information element. In various embodiments, traffic manager may classify each information element based on the extracted control information. For instance, the traffic manager can classify traffic with low latency requirements as QoS traffic while classifying traffic with higher or no latency requirements as non-QoS traffic. Based on the classification, the traffic manager may handle an information element in a specific manner. For example, a traffic manager may direct all QoS traffic to a processor cache and direct all non-QoS traffic to system memory, bypassing the processor cache. In another example, a traffic manager may direct one or more portions of the control information to a processor cache, while directing the payload data to system memory. In another example, a traffic manager may direct all low latency traffic to a processor cache as allocating writes and all other traffic to the processor cache as non-allocating writes. In various embodiments, QoS information may be encoded in a transaction processing hint (TPH) field of an upstream peripheral component interconnect (PCI) express write to a processor cache. This can allow the traffic manager to classify and deliver low latency traffic directly to a cache, while isolating this traffic from traffic with a higher latency tolerance. In these and other ways the traffic manager may enable robust and efficient cache delivery systems to achieve reduced latency in networks and improved memory bandwidths.

In various embodiments, the traffic manager may receive an information element including a payload. Control information may be determined from the information element, and, based on the control information, the information element may be classified. Based on the classification of the information element, a write may be issued to one of a plurality of computer-readable media. In various embodiments, the write may cause the payload to be written to the one of the plurality of computer-readable media The use of a traffic manager provides several technical effects and advantages relative to conventional technologies and solutions. Use of a traffic manager can improve utilization of cache and system memory, leading to lower latencies and more efficient and customizable systems. Further, a traffic manager can enable better control over how portions of an information element are handled and where they are stored. For instance, situations may arise where it is more optimal for some data to go to cache memory while other data is written to system memory. These and other advantages described herein can result in improved cache delivery systems and utilization of cache and system memories, such as with more accurate, reliable, quick, and adaptable handling of information elements received over a network.

With general reference to notations and nomenclature used herein, portion of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 illustrates one embodiment of a cache delivery system 100. Cache delivery system 100 may include an input/output (I/O) device 102, network 112, and clients 114. I/O device 102 may receive information elements (see e.g., FIG. 3B), such as packets, from clients 114 via network 112. Collectively, information elements exchanged between I/O device 102 and clients 114 may be referred to as traffic. Data included in a received information element may be used by I/O device 102 to determine how to handle the information element. For instance, I/O device 102 may determine whether to write one or more portions of data in a received information element to a processor cache based on QoS requirements determined from control information included in the information element. Embodiments are not limited in this context.

As shown in the illustrated embodiment, I/O device 102 may include transceiver 104 and device memory 108. Transceiver 104 may include traffic manager 106. In various embodiments, transceiver 104 includes logic circuitry (e.g., field programmable gate array (FPGA), application specific integrated circuit (ASIC), system on a chip (SOC), microprocessor, etc.) to execute traffic manager 106. In some embodiments, traffic manager 106 may implement one or more logical or functional aspects described with respect transceiver 104. In various embodiments, transceiver 104 may include or refer to a group of components in I/O device 102, such as a grouping by functional category (see, e.g., FIG. 6). For example, transceiver 104 may refer to one or more of a network interface controller (NIC), a platform controller hub (PCH), a media access controller (MAC), and similar components, in various embodiments of I/O device 102. In some embodiments the MAC may be included in an FPGA. Device memory 108 may include one or more computer-readable media 110. In some embodiments, device memory 108 may include or refer to a group of components in I/O device 102, such as a grouping by functional category (see, e.g., FIG. 6). For example, system memory 108 may refer to one or more of a processor cache, an FPGA cache, system memory, and similar components, in various embodiments of I/O device 102.

Transceiver 104 may communicatively couple I/O device 102 with network 112. Network 112 may enable I/O device 102 to communicate with other network devices, such as clients 114. In some embodiments, network 112, may include one or more of a telecommunications network or a content delivery network (CDN). Clients 114 may send information elements to I/O device 102 for processing. For instance, I/O device 102 may form one or more portions of a server, a network accelerator, a virtualized network function, or similar network device.

In various embodiments, transceiver 104 may operate to selectively store data in received information elements to one or more computer-readable media 110 of device memory 108. In various such embodiments, how and/or where data from a received information element is stored may be based on data included in the received information element. For example, traffic manager 106 may use control information to direct all low latency traffic to a processor cache as allocating writes and all other traffic to the processor cache as non-allocating writes. In some embodiments, cache pinning may be used.

These and other features described herein can enable I/O device 102 to keep alive and prioritize data flows (i.e., one or more information elements). In embodiments that utilize cache pinning, I/O device 102 may keep alive and prioritize data flows that are already pinned to a cache. With the ability to keep alive and prioritize a specific data flow, subsequent data flows with the same QoS requirements can be prevented from de-prioritizing the specific data flow (e.g., evicting from cache memory). Preventing de-prioritization of specific data flows can decrease latency and improve performance by decreasing undesirable cache evictions. In some embodiments, keeping alive or prioritizing data flows may include determining whether a cache can accommodate a data flow, such as a high priority data flow, for example. When the cache can accommodate the data flow, the cache instead of system memory may be used. When the cache cannot accommodate the data flow, system memory may be used until the cache become available. In various embodiments, whether a cache can or cannot accommodate a data flow may be based on comparison of one or more features of the data flow to one or more predetermined values. In some embodiments, predetermined values may be associated with or identify characteristics of a cache or system memory. In some examples, predetermined values may include, latency values, time out values, or the like. For example, control information from the high priority data flow may be compared to a current utilization or availability of a cache memory.

Figure 2:
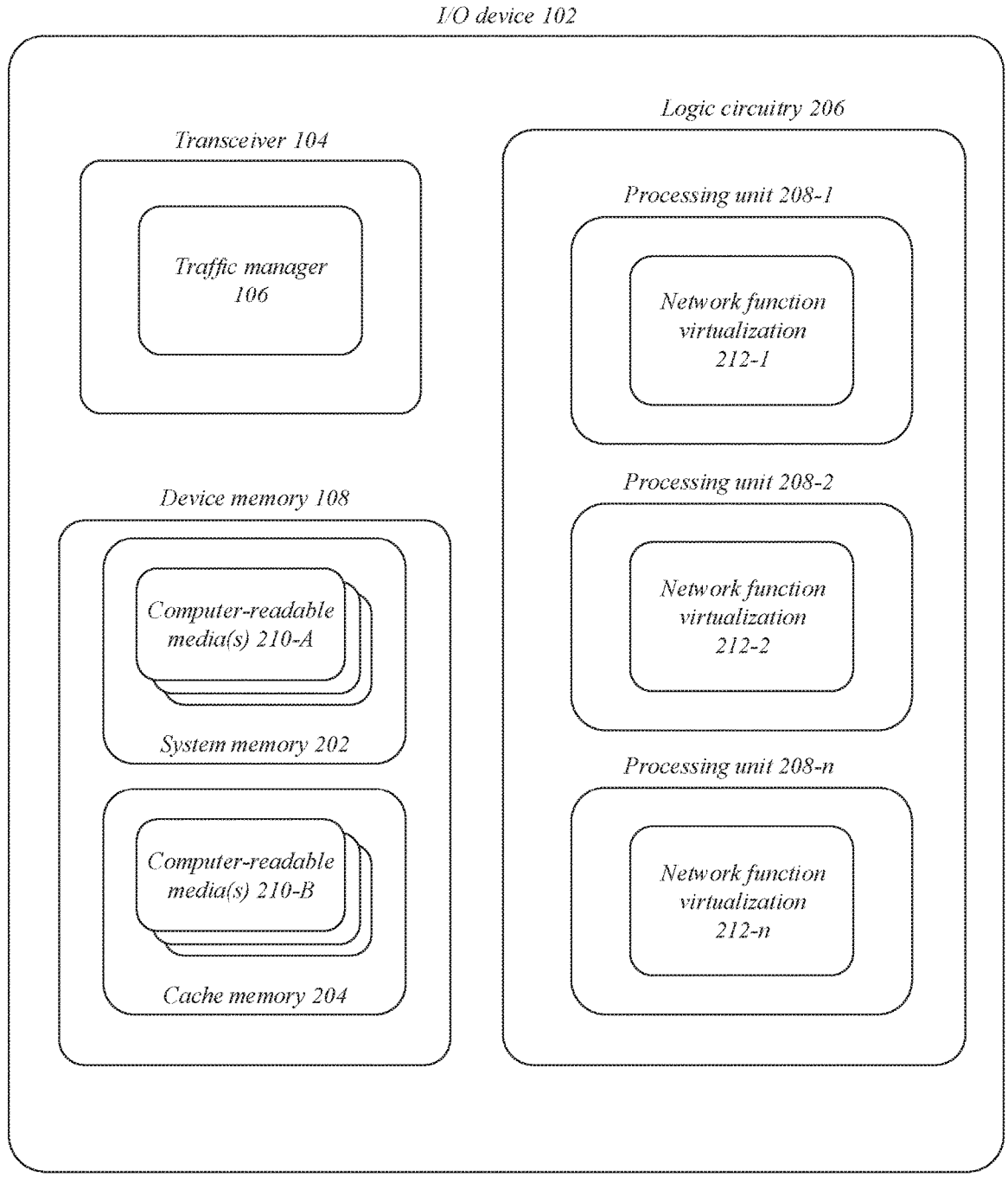
FIG. 2 illustrates an embodiment of an input/output (I/O) device of an exemplary cache delivery system.

FIG. 2 illustrates an embodiment of I/O device 102. In addition to transceiver 104 and traffic manager 106, I/O device 102 may include device memory 108 with system memory 202 and cache memory 204 plus logic circuitry 206. System memory 202 may include computer-readable medias 210-A and cache memory 204 may include computer-readable medias 210-B. Logic circuitry 206 may include one or more processing units 208-1, 208-2, 208-n. In various embodiments, logic circuitry 206 may include or refer to a group of components in I/O device 102, such as a grouping by functional category (see, e.g., FIG. 6). For example, logic circuitry 206 may refer to one or more of a microprocessor, a soft processor (e.g., implemented by FPGA), and similar components, in various embodiments of I/O device 102. In the illustrated embodiments, each processing unit 208-1, 208-2, 208-n can be utilized to implement different virtual network functions (VNFs) in a network function virtualization (NFV) environment. In some embodiments logic circuitry 206 may execute traffic manager 106. Embodiments are not limited in this context.

In various embodiments, system memory 202 provides more storage space than cache memory 204, but at a lower memory bandwidth. Thus, better utilization of cache memory 204 can lead to quicker and more efficient I/O device 102 operation. For instance, in a NFV environment, multiple VNFs may share the same last level cache (LLC) and, because it can be 3-4 times faster to access cache memory 204 than system memory 202, traffic manager 106 may direct all low latency traffic to cache memory 204 and all non-low latency traffic to system memory 202. In some embodiments, system memory 202 may include random access memory (RAM).

Figure 3A:
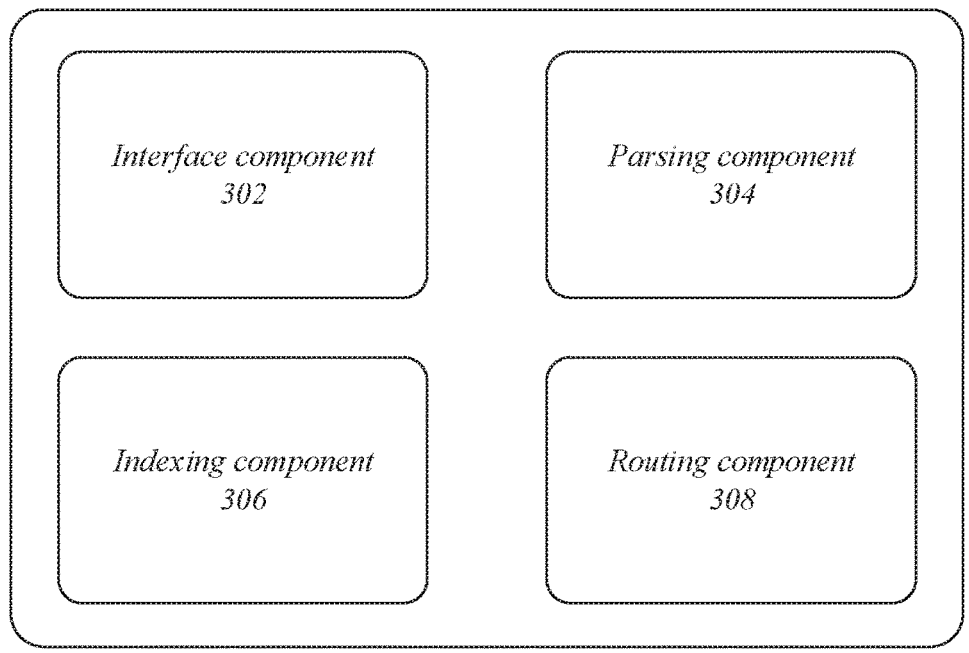
FIG. 3A illustrates an embodiment of a traffic manager of an exemplary I/O device.
Figure 3B:
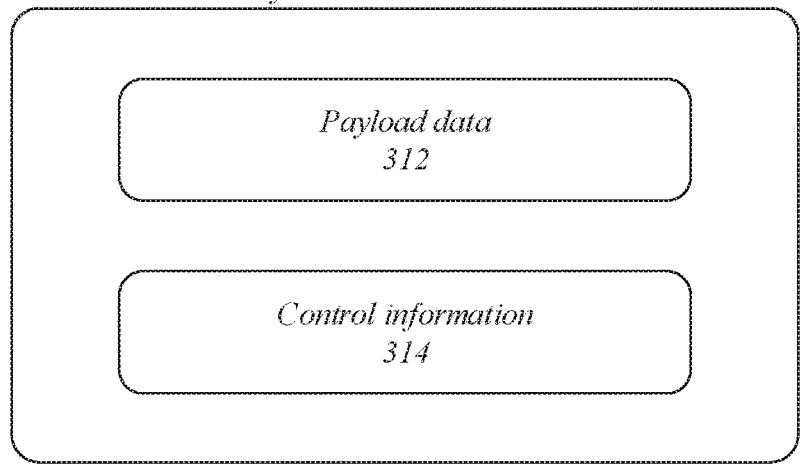
FIG. 3B illustrates an embodiment of an information element.

FIG. 3A illustrates an embodiment of traffic manager 106. The traffic manager 106 may enable I/O device 102 to efficiently utilize device memory 108. Traffic manager may be implemented by one or more portions of I/O device 102. FIG. 3B illustrates an embodiments of an information element 310. In some embodiments, components of the traffic manager 106 may interoperate to receive and manage information elements for I/O device 102. Management of information elements may include determining how and where to store data included in received information elements. In some embodiments, how and where to store data included in a received information element may be determined based on data or information included in a received information element. Managing information elements in this manner can lead to more efficient utilization of cache memory, resulting in a more efficient I/O device 102. Embodiments are not limited in this context.

As shown in FIG. 3A, traffic manager 106 may include interface component 302, parsing component 304, indexing component 306, and routing component 308. Various components of traffic manager 106 may be implemented by one or more portions of I/O device 102. The components may operate to manage where and how one or more portions of each information element, such as a packet, is stored. For instance, where one or more portions of an information element are stored may include the type of memory, such as system or cache, that the one or more portions are to be stored to; and how the one or more portions of information elements are stored may include the type of write, such as allocating or non-allocating, used for the one or more portions of each information element. In some embodiments, how or where two or more portions of the same information element are stored may be different.

Interface component 302 may operate to send and receive information elements. In some embodiments information elements may be received/sent via interface component 302 from/to clients 114 via network 112. In various embodiments, interface component 302 may include one or more portions of various interface devices, such as a network interface controller (NIC), a platform controller hub (PCH), a media access controller (MAC), or similar. Interface component 302 may utilize one or more communication protocols to communicate with clients 114.

Parsing component 304 may operate to recover or extract data from a received information element. As shown in FIG. 3B, an information element 310 may include payload data 312 and control information 314. Control information 314 may refer to data in an information element that either describes payload data 312 or how to process the payload data 312. Payload data 312, on the other hand, may include the actual intended message of the information element. In other words, payload data may not include information sent with the payload data, often referred to as overhead data (e.g., headers, metadata, descriptors, etc.) and used to facilitate payload delivery. Parsing component 304 may separate payload data from control information for received information elements. In some embodiments, control information may comprise a series or tuple of fields of a packet. Parsing component 304 may extract a variable amount of control information (e.g., one or more fields of a packet) to determine a required QoS for an information element. In various embodiments, parsing component 304 may extract a differentiated services code point (DSCP) in a differentiated services field (DS field) of an IP header.

Indexing component 306 may receive the extracted control information from parsing component 304. Based on the received control information, indexing component 306 may classify the information element. In some embodiments, different portions of the same information element may receive different classifications. Situations may arise where it is more optimal for some data to go to cache memory while other data is written to system memory. For instance, it may be useful to direct descriptors to cache memory and payload data to system memory. In various embodiments, traffic manager 106 may program I/O device 102 with tuple lookup information. In various such embodiments, indexing component 306 may determine which descriptors and packets are written to system memory and cache memory based on the packet matching a tuple lookup field. This may considerably reduce programming complexity, enabling a more efficient I/O device 102. Indexing component 306 may convey the classification to routing component 308. In some embodiments, the classification may be conveyed via a memory buffer descriptor.

Routing component 308 may direct one or more portions of an information element (e.g., information element 310) to one or more computer readable media for storage based on classification of the information element. In various embodiments routing component 308 may include a root complex. In various such embodiments, depending on classification, the root complex may direct all low latency traffic to issue allocating writes to processor cache and direct all other traffic to issue non-allocating writes to processor cache. In embodiments utilizing a root complex, a transaction processing hint (TPH) field could be used to convey classification of information elements to the root complex.

Figure 4A:
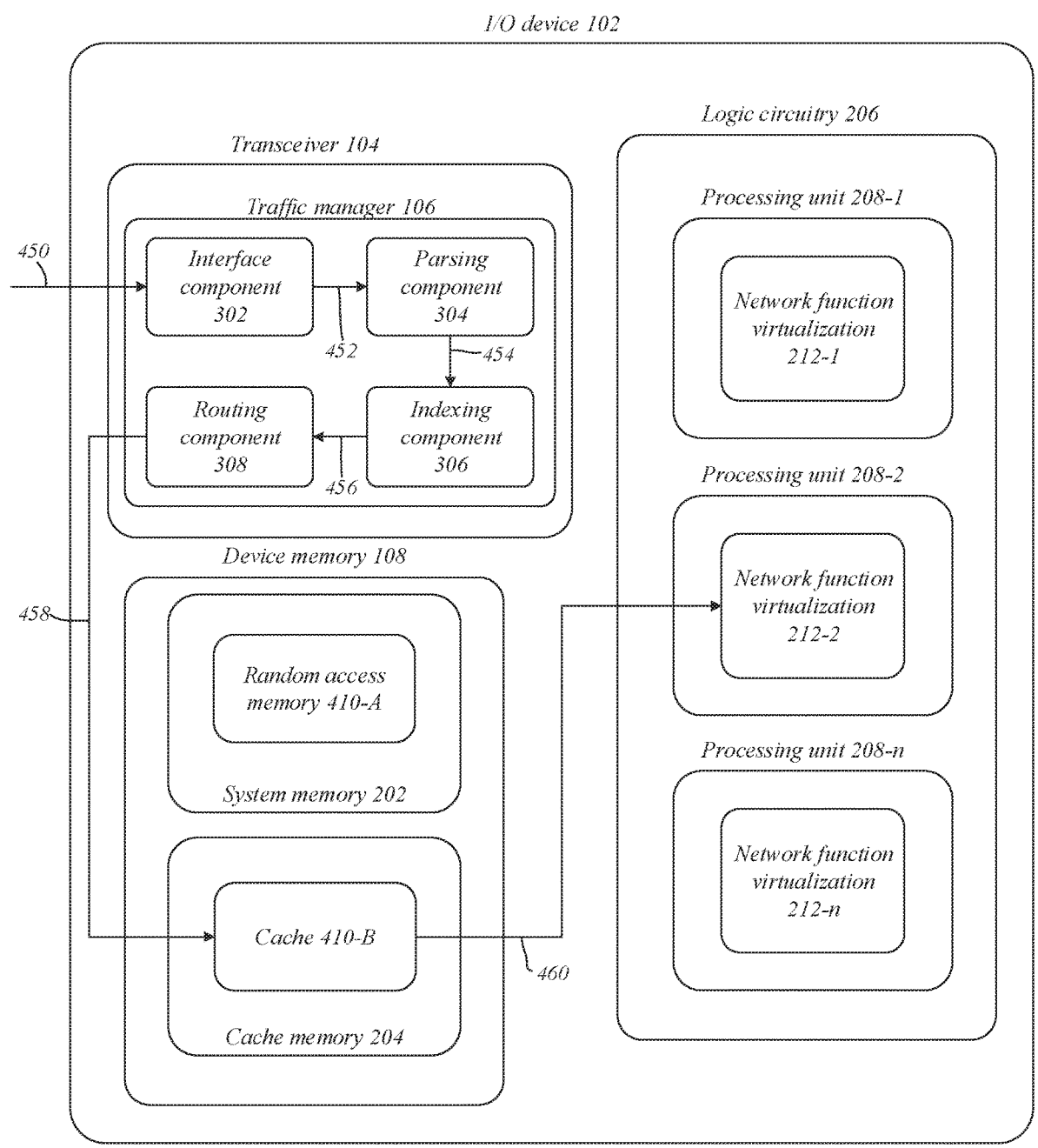
FIG. 4A illustrates an example process flow for an embodiment of an I/O device.

FIG. 4A illustrates an example process flow 400A for an embodiment of an I/O device 102. In the illustrated embodiment, system memory 202 may include random access memory (RAM) 410-A and cache memory 204 may include cache 410-B. In the exemplary process flow, interface component 302, parsing component 304, routing component 308, and indexing component 306 of the traffic manager 106 may operate to efficiently utilize cache memory 204, resulting in a better performing I/O device 102. Embodiments are not limited in this context.

At 450, interface component 302 of traffic manager 106 may receive an information element via a communications network, such as a telecommunications network. In some embodiments, traffic manager 106 receives information elements via hardware of one or more NICs, PCHs, MACs, or similar devices that can be included in transceiver 104. At 452, the information element may be provided to parsing component 304 as a bit stream. Parsing component 304 may extract control information and payload data from the bit stream.

At 454, indexing component 306 may classify the information element based on the extracted control information as Voice over Internet Protocol (VoIP) data. Based on classification as VoIP, at 456, indexing component 306 may identify the information element as a QoS packet to routing component 308. In some embodiments, classification of the information element may be based on payload data or a combination of control information and payload data. In some embodiments, different portions of an information element may receive different classifications. In various embodiments, communication between one or more components of traffic manager 106 may utilize memory buffer descriptors. For example, routing component 308 may determine whether to write an information element directly to system memory 202 or cache memory 204 based on a snoop field.

At 458, routing component 308 may write data of the QoS packet directly to cache 410-B. At 460, processing unit 208-2 may fetch the data from cache 410-B. This can eliminate a system memory 202 access latency penalty and minimize jitter experienced by the packet, resulting in a more efficient I/O device 102. In some embodiments, routing component 308 may include a root complex.

Figure 4B:
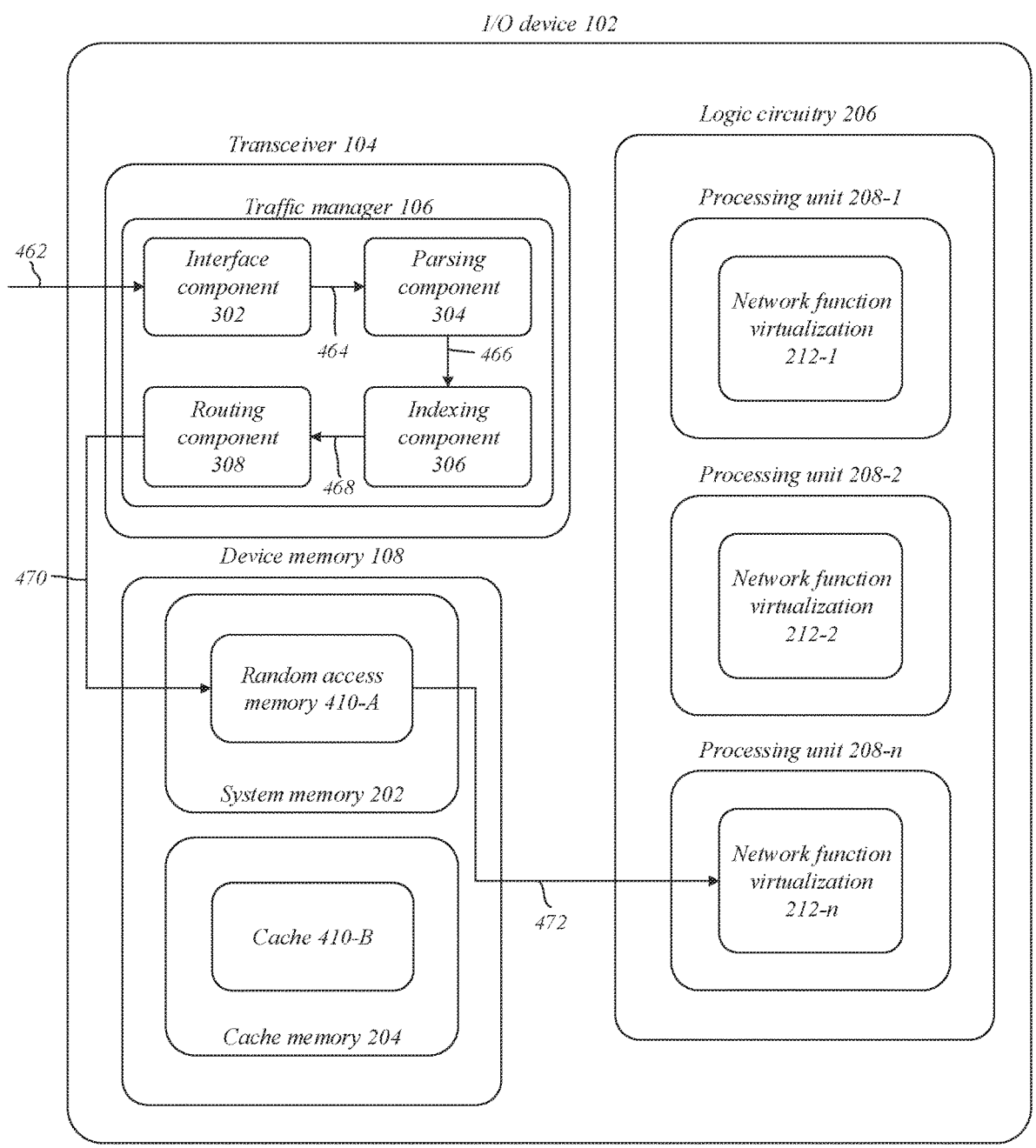
FIG. 4B illustrates an example process flow for an embodiment of an I/O device.

FIG. 4B illustrates an example process flow 400B for an embodiment of an I/O device 102. In the illustrated embodiment, system memory 202 may include random access memory (RAM) 410-A and cache memory 204 may include cache 410-B. In the exemplary process flow, interface component 302, parsing component 304, routing component 308, and indexing component 306 of the traffic manager 106 may operate to efficiently utilize cache memory 204, resulting in a better performing I/O device 102. Embodiments are not limited in this context.

At 462, interface component 302 of traffic manager 106 may receive an information element via a telecommunications network. In some embodiments, traffic manager 106 receives information elements via hardware of one or more NICs, PCHs, MACs, or similar devices that can be included in transceiver 104. At 464, the information element may be provided to parsing component 304 as a bit stream. Parsing component 304 may extract control information and payload data from the bit stream.

At 466, indexing component 306 may classify the information element based on the extracted control information as web server data. Based on classification as web server data, at 468, indexing component 306 may identify the information element as a non-QoS packet to routing component 308. In some embodiments, classification of the information element may be based on payload data or a combination of control information and payload data. In some embodiments, different portions of an information element may receive different classifications. In various embodiments, communication between one or more components of traffic manager 106 may utilize memory buffer descriptors. For example, routing component 308 may determine whether to write an information element directly to system memory 202 or cache memory 204 based on a snoop field.

At 470, routing component 308 may write data of the non-QoS packet directly to RAM 410-A. At 472, processing unit 208-*n* may fetch the data from RAM 410-A. Although this operation can incur a system memory 202 access latency penalty, as long as the information element was properly classified as non-QoS, no requirements are violated. Further, sending non-QoS packets to system memory 202 can prevent cache memory 204 from becoming polluted, enabling more efficient I/O device 102. In some embodiments, routing component 308 may include a root complex. In various embodiments, processing unit 208-*n* may fetch the data from cache 410-B after the data has been pulled from RAM 410-A to cache 410-B. In various such embodiments, the data may be pulled into cache 410-B from RAM 410-A in preparation for processing the data. For instance, the data may be pulled into cache 410-B when sufficient space is available in cache 410-B or when processing unit 208-*n* requests the data.

Figure 5:
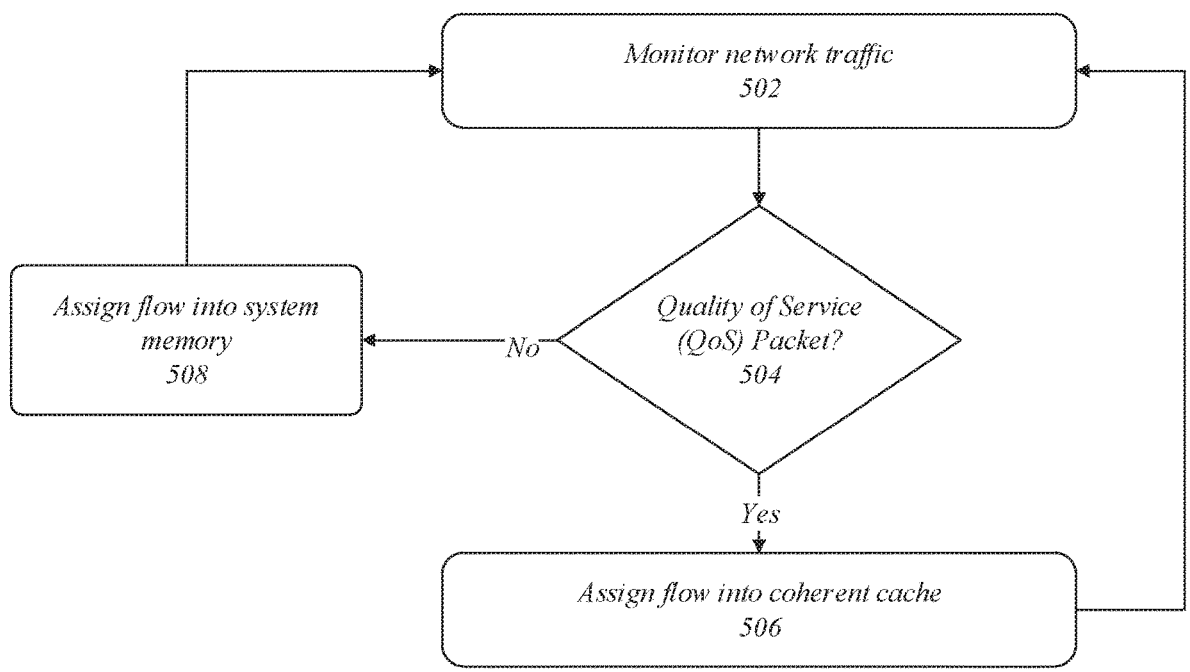
FIG. 5 illustrates an embodiment of a logic flow.

FIG. 5 illustrates an embodiment of a logic flow 500. The first logic flow 500 may illustrate a logical loop for managing network traffic. In various embodiments, this logical loop may be implemented by one or more portions of I/O device 102, such as logic circuitry executing traffic manager 106. When implemented, this logical loop can result in a more efficient I/O device 102. Embodiments are not limited in this context.

At 502, network traffic may be monitored. Monitoring network traffic may include identifying at least one characteristic of information elements received at I/O device 102. At 504, it may be determined whether an information element is a QoS packet or a non-QoS packet. In some embodiments, the identified at least one characteristic is the basis of this determination. When the information element is a QoS packet, the flow may proceed to 506. At 506, QoS packets may be assigned into a coherent cache. The flow may then return to step 502. When the information element is not a QoS packet, the flow may proceed to 508. At 508, information elements may be assigned into system memory. The flow may then return to step 502.

Figure 6:
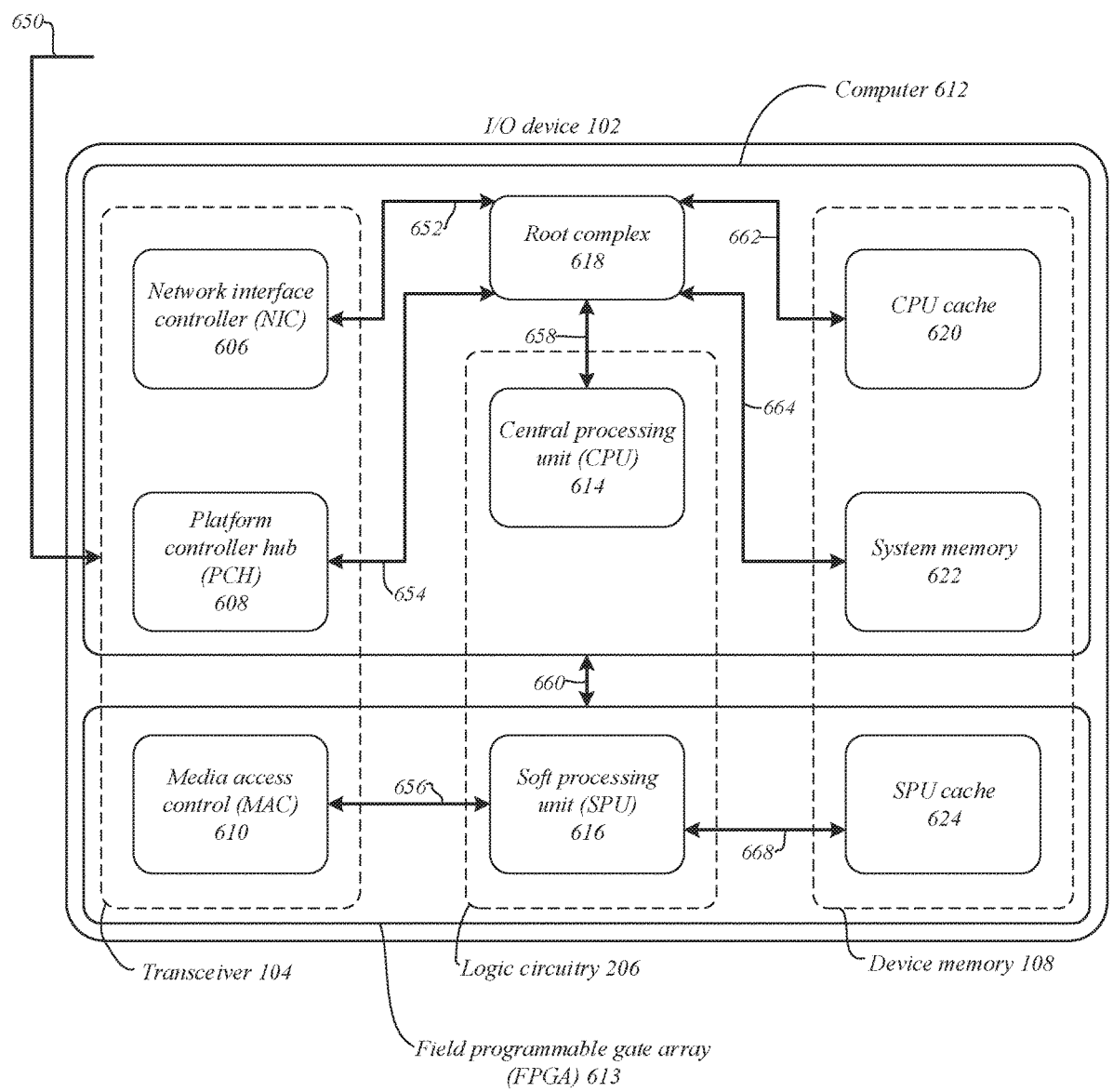
FIG. 6 illustrates an embodiment of an I/O device.

FIG. 6 illustrates an embodiment of an I/O device 102. In various embodiments, the I/O device 102 of FIG. 6 may implement logic flow 500. In the illustrated embodiment, I/O device 102 may include computer 612 and FPGA 613. In various embodiments, components of computer 612 and FPGA 613 may interoperate to extract a variable number of fields per received information element to generate QoS data. In some embodiments, QoS data may represent a target latency for the information element. The QoS data may then be encoded in the TPH fields of the upstream PCI express write to a cache via a root complex. The write may be allocating or non-allocating based on the TPH fields. As the data from a non-allocating cache write will be evicted from the cache to system memory, the scenario of a low priority information element evicting a high priority information element from the cache can be avoided. This and other features can lead to a more efficient and robust I/O device 102. Embodiments are not limited in this context.

In the illustrated embodiment, computer 612 can include NIC 606, PCH 608, CPU 614, root complex 618, CPU cache 620, and system memory 622. FPGA 613 may include MAC 610, SPU 616, and SPU cache 624. As mentioned above, transceiver 104, logic circuitry 206, and device memory 108 may refer to different components of I/O device 102 grouped by functional category. In the illustrated embodiment, transceiver 104 refers to NIC 606, PCH 608, and MAC 610. Logic circuitry 206 refers to CPU 614, and SPU 616. Device memory 108 refers to CPU cache 620, system memory 622, and SPU cache 624.

In various embodiments, traffic manager 106 including one or more of interface component 302, parsing component 304, indexing component 306, and routing component 308 may be implemented by one or more components in one or more of computer 612 and FPGA 613. For instance, the functionality described with respect to traffic manager 106 may be achieved through interoperation of transceiver 104, logic circuitry 206, device memory 108, and root complex 618. In some embodiments, multiple traffic managers may be implemented. For example, NIC 606, PCH 608, or MAC 610 may utilize separate traffic managers. In another example, CPU 614 may implement a first traffic manager for information elements received via NIC 606 or PCH 608, while SPU 616 may implement a second traffic manager for information elements received via MAC 610. In various embodiments, I/O device 102 may operate to efficiently utilize CPU cache 620 and SPU cache 624, resulting in a better performing I/O device 102.

At 650, information elements may be received by transceiver 104 via one or more of NIC 606, PCH 608, and MAC 610. In various embodiments, NIC 606, PCH 608, and MAC 610 each include separate interface hardware. In various such embodiments, NIC 606, PCH 608, and MAC 610 may independently send and receive information elements. In some embodiments, one or more of NIC 606, PCH 608, and MAC 610 may receive or send information elements over separate networks. In various embodiments, an information element received via one of NIC 606, PCH 608, MAC 610 may resulting in data being sent via a different one of NIC 606, PCH 608, MAC 610.

At 652, NIC 606 may communicate with root complex 618. In some embodiments, a PCIe x/8×16 connection may communicatively couple NIC 606 and root complex 618. At 654, PCH may communicate with root complex 618. In some embodiments, one or more of PCIe and direct media interface connections may communicatively couple PCH 608 with root complex 619. At 656 MAC 610 may communicate with SPU 616 via circuitry of FPGA 613. At 658, root complex 618 may communicate with CPU 614 via circuitry of computer 612. At 660, computer 612 may communicate with FPGA 613. In some embodiments, an UltraPath Interconnet (UPI) may communicatively couple computer 612 and FPGA 613. At 662, root complex 618 may communicate with CPU cache 620 via circuitry of computer 612. At 664, root complex 618 may communicate with system memory 622 via circuitry of computer 612. At 668, SPU 616 may communicate with SPU cache 624 via circuitry of FPGA 613. In some embodiments, communication between one or more components of I/O device 102 may utilize memory buffer descriptors.

In the various embodiments, interoperation of components of computer 612 and FPGA 613 may proceed as follows. A variable number of fields may be extracted from each received information element. Based on the extracted fields the appropriate QoS requirements can be determined and generated as QoS data. In some embodiments QoS data is a classification of the information element. Based on the QoS data, low latency information elements may be identified and associated with a processing hint of 3 or target priority, which can be used by root complex 618 to perform an allocating write to CPU cache 620. All other information elements may be identified and associated with a processing hint of 1 or target, which can be used by root complex 618 to perform a non-allocating write to CPU cache 620. In these and other embodiments, all received information elements may be classified as snoopable. In various embodiments, PCIe ports can have allocating flow dynamically varied, via bit 7 of PERFCTRLSTS register located in the configuration space at offset 0×0180. In various such embodiments, allocating flow may be dynamically varied based on information element classification and QoS settings indicated by the processor hint contained within the memory transaction header.

Figure 7:
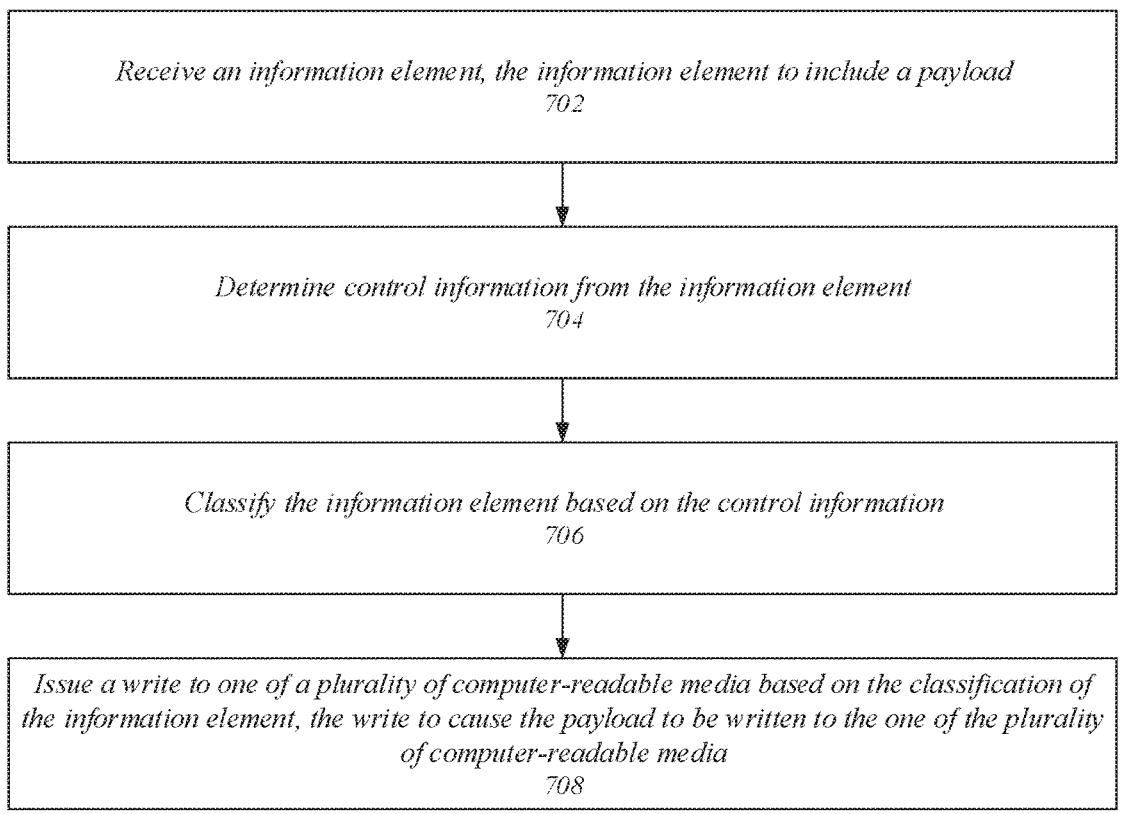
FIG. 7 illustrates an embodiment of a logic flow.

FIG. 7 illustrates one embodiment of a logic flow 700. The logic flow 700 may be representative of some or all of the operations executed by one or more embodiments described herein, such as I/O device 102 or the traffic manager 106. Embodiments are not limited in this context.

In the illustrated embodiment shown in FIG. 7, the logic flow 700 may receive an information element at 702. The information element can include a payload. For example, the traffic manager 106 may receive an information element 310. In various embodiments, the traffic manager 106 may receive the information element 310 from a client 114 via a network 112.

At 704, control information may be determined from the information element. For example, control information 314 may be extracted from information element 310 by traffic manager 106. In some embodiments, control information 314 may include a packet parsing tuple. In various embodiments, control information 314 may include one or more QoS fields. In some embodiments, control information 314 may include a differentiated services (DS) field.

The information element may be classified based on the control information at 706. For example, traffic manager 106 may classify an information element 310 based on control information 314. In some embodiments, information element 310 may be classified as a QoS or non-QoS packet based on control information 314. In embodiments with a packet parsing tuple included in the control information, the packet parsing tuple may be compared to a tuple lookup data structure to classify information element 310.

At 708, a write to one or a plurality of computer-readable media based on the classification of the information element may be issued. The write may cause the payload to be written to the one of the plurality of computer-readable media. For example, traffic manager 106 may cause information element 310 to be written to cache memory 204 based on classification of information element 310. In some embodiments, issuing the write may include issuing a non-allocating write to cache memory 204 for payload data 312 based on classification of information element 310. In various embodiments, issuing the write may include issuing an allocating write to cache memory 204 for payload data 312 based on classification of information element 310.

FIG. 8 illustrates an embodiment of a storage medium 800. Storage medium 800 may comprise any non-transitory computer-readable storage medium or machine-readable storage medium, such as an optical, magnetic or semiconductor storage medium. In various embodiments, storage medium 800 may comprise an article of manufacture. In some embodiments, storage medium 800 may store computer-executable instructions, such as computer-executable instructions to implement one or more of logic flows 400A, 400B, 500, 600, 700 of FIGS. 4A-7. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 9:
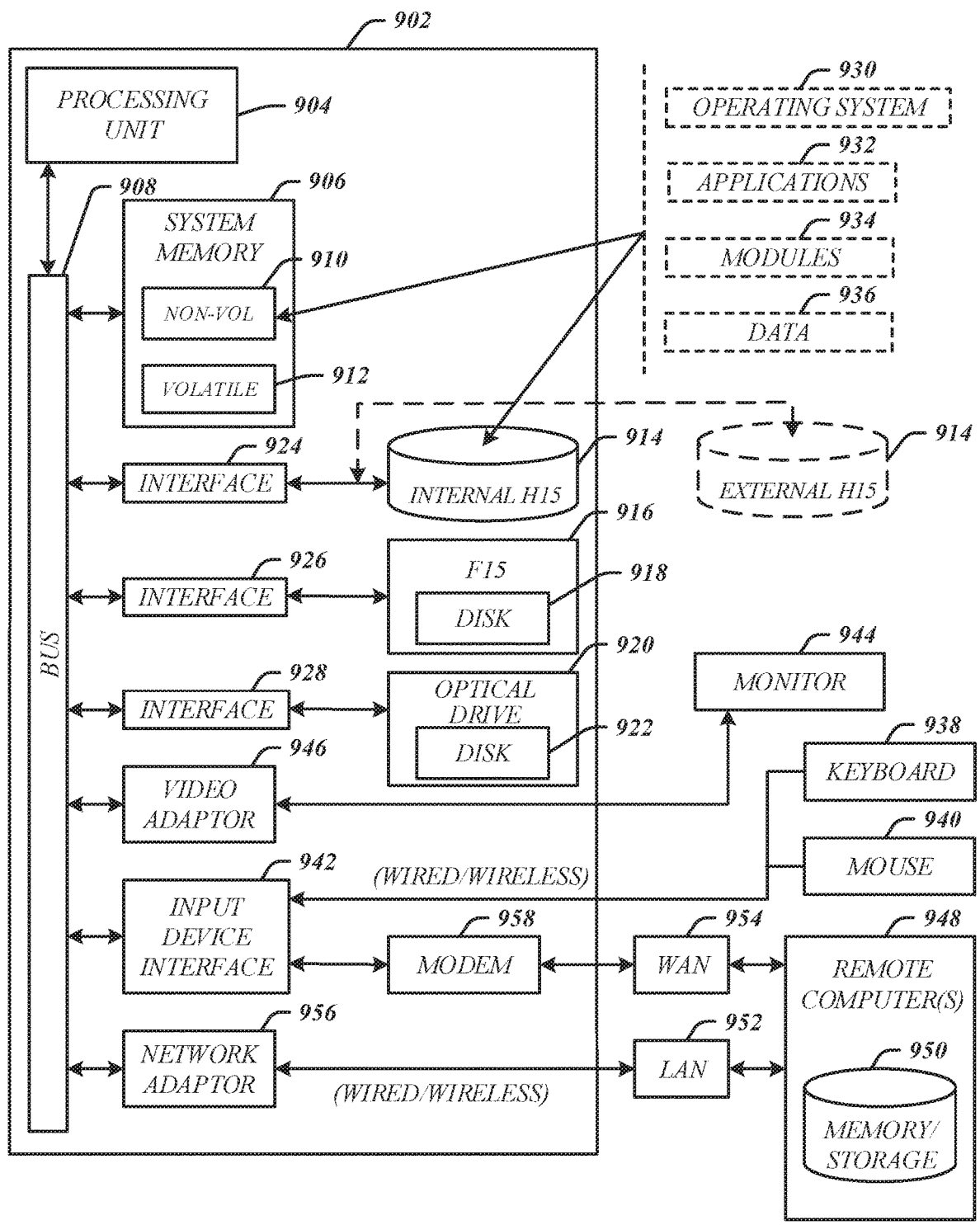
FIG. 9 illustrates an embodiment of a computing architecture.

FIG. 9 illustrates an embodiment of an exemplary computing architecture 900 that may be suitable for implementing various embodiments as previously described. In various embodiments, the computing architecture 900 may comprise or be implemented as part of an electronic device. In some embodiments, the computing architecture 900 may be representative, for example, of a processor server that implements one or more components of the traffic manager 106. In some embodiments, computing architecture 900 may be representative, for example, of a terminal device that implements one or more components of I/O device 102. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 994 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 994 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
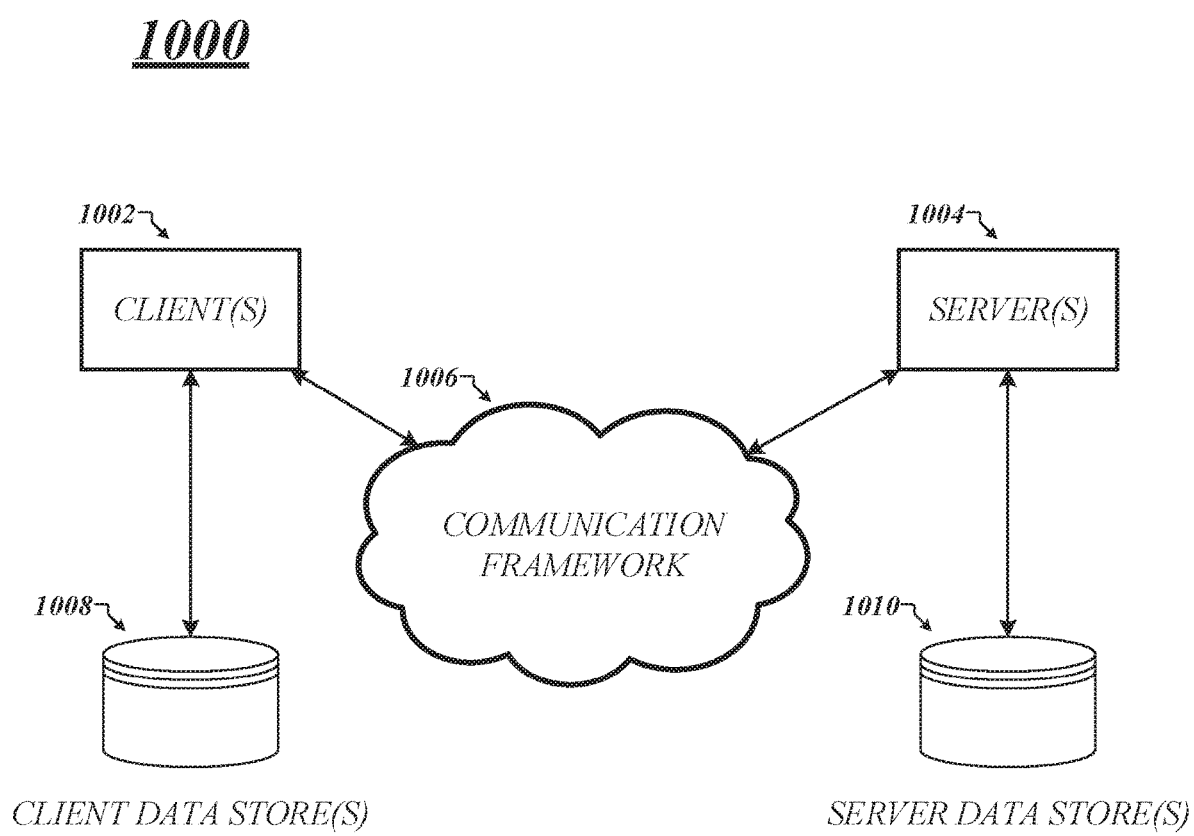
FIG. 10 illustrates an embodiment of a communications architecture.

FIG. 10 illustrates a block diagram of an exemplary communications architecture 1000 suitable for implementing various embodiments as previously described. The communications architecture 1400 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 and the servers 1004 are operatively connected to one or more respective client data stores 1008 and server data stores 1010 that can be employed to store information local to the respective clients 1002 and servers 1004, such as cookies and/or associated contextual information. In various embodiments, any one of servers 1004 may implement one or more of logic flows 400A-700 of FIGS. 4A-7, and storage medium 800 of FIG. 8 in conjunction with storage of data received from any one of clients 1002 on any of server data stores 1010.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus, comprising: a memory; and logic, at least a portion of the logic in circuitry coupled to the memory, the logic to: receive an information element, the information element to include a payload; determine control information from the information element; classify the information element based on the control information; and issue a write to one of a plurality of computer-readable media based on the classification of the information element, the write to cause the payload to be written to the one of the plurality of computer-readable media.

Example 2 includes the subject matter of Example 1, the logic to classify the information element as a quality of service (QoS) packet based on the control information.

Example 3 includes the subject matter of Example 2, the one of the plurality of computer-readable media comprising cache memory.

Example 4 includes the subject matter of Example 3, the cache memory comprising a last level cache (LLC).

Example 5 includes the subject matter of Example 3, the cache memory comprising a processor cache.

Example 6 includes the subject matter of Example 1, the logic to classify the information element as a non-QoS packet based on the control information.

Example 7 includes the subject matter of Example 6, the one of the plurality of computer-readable media comprising random access memory.

Example 8 includes the subject matter of Example 6, the one of the plurality of computer-readable media comprising system memory.

Example 9 includes the subject matter of Example 1, the logic to enable or disable a no snoop field in a peripheral component interconnect express (PCIe) write transaction based on the classification of the information element.

Example 10 includes the subject matter of Example 1, the logic to issue an allocating write to the one of the plurality of computer-readable media for the payload based on the classification of the information element, the one of the plurality of computer-readable media comprising a processor cache.

Example 11 includes the subject matter of Example 1, the logic to issue a non-allocating write to the one of the plurality of computer-readable media for the payload based on the classification of the information element, the one of the plurality of computer-readable media comprising a processor cache.

Example 12 includes the subject matter of Example 1, the control information comprising a packet parsing tuple.

Example 13 includes the subject matter of Example 12, the logic to compare the packet parsing tuple to a tuple lookup data structure to classify the information element.

Example 14 includes the subject matter of Example 12, the packet parsing tuple comprising a null tuple.

Example 15 includes the subject matter of Example 1, the control information comprising one or more QoS fields.

Example 16 includes the subject matter of Example 1, the control information comprising a differentiated services (DS) field.

Example 17 includes the subject matter of Example 1, the logic to associate the information element with a type of application based on the control information.

Example 18 includes the subject matter of Example 1, the logic comprising a field programmable gate array (FPGA).

Example 19 includes the subject matter of Example 1, comprising a network interface controller (NIC).

Example 20 includes the subject matter of Example 1, comprising a point to point processor interconnect.

Example 21 includes the subject matter of Example 1, comprising a direct memory access (DMA) controller.

Example 22 includes the subject matter of Example 1, one or more of the plurality of computer-readable media comprising the memory.

Example 23 is a computer-implemented method, comprising: receiving an information element, the information element to include a payload; determining control information from the information element; classifying the information element based on the control information; and issuing a write to one of a plurality of computer-readable media based on the classification of the information element, the write to cause the payload to be written to the one of the plurality of computer-readable media.

Example 24 includes the subject matter of Example 23, comprising classifying the information element as a quality of service (QoS) packet based on the control information.

Example 25 includes the subject matter of Example 24, the one of the plurality of computer-readable media comprising cache memory.

Example 26 includes the subject matter of Example 25, the cache memory comprising a last level cache (LLC).

Example 27 includes the subject matter of Example 25, the cache memory comprising a processor cache.

Example 28 includes the subject matter of Example 23, comprising classifying the information element as a non-QoS packet based on the control information.

Example 29 includes the subject matter of Example 28, the one of the plurality of computer-readable media comprising random access memory.

Example 30 includes the subject matter of Example 28, the one of the plurality of computer-readable media comprising system memory.

Example 31 includes the subject matter of Example 23, comprising enabling or disabling a no snoop field in a peripheral component interconnect express (PCIe) write transaction based on the classification of the information element.

Example 32 includes the subject matter of Example 23, comprising issuing an allocating write to the one of the plurality of computer-readable media for the payload based on the classification of the information element, the one of the plurality of computer-readable media comprising a processor cache.

Example 33 includes the subject matter of Example 23, comprising issuing a non-allocating write to the one of the plurality of computer-readable media for the payload based on the classification of the information element, the one of the plurality of computer-readable media comprising a processor cache.

Example 34 includes the subject matter of Example 23, the control information comprising a packet parsing tuple.

Example 35 includes the subject matter of Example 34, comprising comparing the packet parsing tuple to a tuple lookup data structure to classify the information element.

Example 36 includes the subject matter of Example 34, the packet parsing tuple comprising a null tuple.

Example 37 includes the subject matter of Example 23, the control information comprising one or more QoS fields.

Example 38 includes the subject matter of Example 23, the control information comprising a differentiated services (DS) field.

Example 39 includes the subject matter of Example 23, comprising associating the information element with a type of application based on the control information.

Example 40 is one or more computer-readable media to store instructions that when executed by a processor circuit causes the processor circuit to: receive an information element, the information element to include a payload; determine control information from the information element; classify the information element based on the control information; and issue a write to one of a plurality of computer-readable media based on the classification of the information element, the write to cause the payload to be written to the one of the plurality of computer-readable media.

Example 41 includes the subject matter of Example 40, with instructions to classify the information element as a quality of service (QoS) packet based on the control information.

Example 42 includes the subject matter of Example 41, the one of the plurality of computer-readable media comprising cache memory.

Example 43 includes the subject matter of Example 42, the cache memory comprising a last level cache (LLC).

Example 44 includes the subject matter of Example 42, the cache memory comprising a processor cache.

Example 45 includes the subject matter of Example 40, with instructions to classify the information element as a non-QoS packet based on the control information.

Example 46 includes the subject matter of Example 45, the one of the plurality of computer-readable media comprising random access memory.

Example 47 includes the subject matter of Example 45, the one of the plurality of computer-readable media comprising system memory.

Example 48 includes the subject matter of Example 40, with instructions to enable or disable a no snoop field in a peripheral component interconnect express (PCIe) write transaction based on the classification of the information element.

Example 49 includes the subject matter of Example 40, with instructions to issue an allocating write to the one of the plurality of computer-readable media for the payload based on the classification of the information element, the one of the plurality of computer-readable media comprising a processor cache.

Example 50 includes the subject matter of Example 40, with instructions to issue a non-allocating write to the one of the plurality of computer-readable media for the payload based on the classification of the information element, the one of the plurality of computer-readable media comprising a processor cache.

Example 51 includes the subject matter of Example 40, the control information comprising a packet parsing tuple.

Example 52 includes the subject matter of Example 51, with instructions to compare the packet parsing tuple to a tuple lookup data structure to classify the information element.

Example 53 includes the subject matter of Example 51, the packet parsing tuple comprising a null tuple.

Example 54 includes the subject matter of Example 40, the control information comprising one or more QoS fields.

Example 55 includes the subject matter of Example 40, the control information comprising a differentiated services (DS) field.

Example 56 includes the subject matter of Example 40, with instructions to associate the information element with a type of application based on the control information.

Example 57 is a system to manage network traffic, comprising: a network device; and logic, at least a portion of the logic implemented by the network device, the logic to:

receive, via an interface component of the network device, an information element, the information element to include a payload; determine, via a parsing component, control information from the information element; classify, via an indexing component, the information element based on the control information; and issue, via a routing component, a write to one of a plurality of computer-readable media based on the classification of the information element, the write to cause the payload to be written to the one of the plurality of computer-readable media.

Example 58 includes the subject matter of Example 57, the network device comprising a memory and at least a portion of the logic in circuitry coupled to the memory.

Example 59 includes the subject matter of Example 58, the plurality of computer-readable media comprising the memory.

Example 60 includes the subject matter of Example 57, the network device comprising a physical network device.

Example 61 includes the subject matter of Example 60, the physical network device comprising one or more of a network interface controller (NIC), a field programmable gate array (FPGA), an application specific integrated circuit (ASIC), a system on a chip (SOC), a platform controller hub (PCH), a direct media interface (DMI), an ultrapath interconnect (UPI), a direct memory access (DMA) controller, a complex programmable logic device (CPLD) a microprocessor, a server, a network node, and a computer.

Example 62 includes the subject matter of Example 57, the network device comprising a virtual network device.

Example 63 includes the subject matter of Example 62, the virtual network device comprising one or more of a virtualized network function (VNF), a soft processor, a hypervisor, a virtual disk drive, and a virtual private network (VPN).

Example 64 includes the subject matter of Example 62, the virtual network device to implement one or more network function virtualizations (NFVs).

Example 65 includes the subject matter of Example 62, the virtual network device instantiated by a compute pool.

Example 66 includes the subject matter of Example 57, the network device comprising one or more of the parsing component, the indexing component, and the routing component.

Example 67 includes the subject matter of Example 57, the routing component to issue the write to the one of the plurality of computer-readable media via a peripheral component interconnect express (PCIe) bus.

Example 68 includes the subject matter of Example 57, the logic comprising at least a portion of a point to point processor interconnect.

Example 69 is an apparatus, comprising: interface means to receive an information element, the information element to include a payload; parsing means to determine control information from the information element; indexing means to classify the information element based on the control information; and routing means to issue a write to one of a plurality of computer-readable media based on the classification of the information element, the write to cause the payload to be written to the one of the plurality of computer-readable media.

Example 70 includes the subject matter of Example 69, the indexing means to classify the information element as a quality of service (QoS) packet based on the control information.

Example 71 includes the subject matter of Example 70, the one of the plurality of computer-readable media comprising cache memory.

Example 72 includes the subject matter of Example 71, the cache memory comprising a last level cache (LLC).

Example 73 includes the subject matter of Example 71, the cache memory comprising a processor cache.

Example 74 includes the subject matter of Example 69, the indexing means to classify the information element as a non-QoS packet based on the control information.

Example 75 includes the subject matter of Example 74, the one of the plurality of computer-readable media comprising random access memory.

Example 76 includes the subject matter of Example 74, the one of the plurality of computer-readable media comprising system memory.

Example 77 includes the subject matter of Example 69, the routing means to enable or disable a no snoop field in a peripheral component interconnect express (PCIe) write transaction based on the classification of the information element.

Example 78 includes the subject matter of Example 69, the routing means to issue an allocating write to the one of the plurality of computer-readable media for the payload based on the classification of the information element, the one of the plurality of computer-readable media comprising a processor cache.

Example 79 includes the subject matter of Example 69, the routing means to issue a non-allocating write to the one of the plurality of computer-readable media for the payload based on the classification of the information element, the one of the plurality of computer-readable media comprising a processor cache.

Example 80 includes the subject matter of Example 69, the control information comprising a packet parsing tuple.

Example 81 includes the subject matter of Example 80, the indexing means to compare the packet parsing tuple to a tuple lookup data structure to classify the information element.

Example 82 includes the subject matter of Example 80, the packet parsing tuple comprising a null tuple.

Example 83 includes the subject matter of Example 69, the control information comprising one or more QoS fields.

Example 84 includes the subject matter of Example 69, the control information comprising a differentiated services (DS) field.

Example 85 includes the subject matter of Example 69, the indexing means to associate the information element with a type of application based on the control information.

Example 86 includes the subject matter of Example 1, the plurality of computer-readable media including a cache memory and a system memory.

Example 87 includes the subject matter of Example 86, the logic to determine the cache memory can accommodate the information element based on a predetermined value associated with the cache memory, the one of the plurality of computer-readable media comprising the cache memory.

Example 88 includes the subject matter of Example 87, the logic to prevent a subsequent information element from evicting the information element from the cache memory.

Example 89 includes the subject matter of Example 86, the logic to determine the cache memory cannot accommodate the information element based on a predetermined value associated with the cache memory, the one of the plurality of computer-readable media comprising the system memory.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, comprising:
a memory; and
logic, at least a portion of the logic in circuitry coupled to the memory, the logic to:
receive an information element, the information element to include control information and a payload;
separately classify each of the payload and the control information as one of a quality of service (QoS) traffic or a non-QoS traffic; and
issue at least one write to one or more of a plurality of computer-readable media based on the classifications of the payload and the control information, the plurality of computer-readable media comprising a first computer-readable media and a second computer-readable media, the at least one write to comprise a first write to cause the payload to be written to the first computer-readable media based on the classification of the payload and a second write to cause the control information to be written to the second computer-readable media based on the classification of the control information.

2. The apparatus of claim 1, wherein the plurality of computer-readable media include a cache memory and a system memory, wherein the classifications of the payload and the control information are to comprise different classifications.

3. The apparatus of claim 2, wherein the logic is to determine the cache memory can accommodate the information element based on a predetermined value associated with the cache memory, wherein the first computer-readable media is to comprise the cache memory, wherein a number of fields of the control information for the information element are to be different than a number of fields of a control information of a different information element.

4. The apparatus of claim 3, wherein the logic is further to prevent a subsequent information element from evicting the information element from the cache memory, wherein the cache memory is to be shared by a plurality of virtual network functions (VNFs).

5. The apparatus of claim 2, wherein the logic is to determine the cache memory cannot accommodate the information element based on a predetermined value associated with the cache memory, wherein the control information is to comprise a differentiated services code point (DSCP) in a differentiated services (DS) field of an IP header, the classifications to be conveyed by one or more memory buffer descriptors.

6. The apparatus of claim 1, the one or more of the plurality of computer-readable media comprising system memory or random access memory.

7. The apparatus of claim 1, wherein the logic is to enable or disable a no snoop field in a peripheral component interconnect express (PCIe) write transaction based on the classification of the information element, wherein the control information is to comprise a PCIe transaction processing hint (TPH) field, wherein a PCIe root complex of the apparatus is to comprise at least a portion of the logic.

8. The apparatus of claim 1, wherein the logic is to issue an allocating write to the first computer-readable media for the payload based on the classification of the payload, the first computer-readable media comprising a processor cache.

9. The apparatus of claim 1, wherein the logic is to issue a non-allocating write to the first computer-readable media for the payload based on the classification of the payload, the first computer-readable media comprising a processor cache.

10. The apparatus of claim 1, the logic to determine a priority for the information element based on QoS data generated using the control information, the priority comprising a high priority or a low priority.

11. The apparatus of claim 10, the logic to store the information element in a cache memory responsive to the information element having the high priority.

12. One or more computer-readable media to store instructions that when executed by a processor circuit causes the processor circuit to:
receive an information element, the information element to include a control information and a payload;
separately classify each of the payload and control information as one of a quality of service (QoS) traffic or a non-QoS traffic; and
issue at least one write to one or more of a plurality of computer-readable media based on the classifications of the payload and the control information, the plurality of computer-readable media comprising a first computer-readable media and a second computer-readable media, the at least one write to comprise a first write to cause the payload to be written to the first computer-readable media based on the classification of the payload and a second write to cause the control information to be written to the second computer-readable media based on the classification of the control information.

13. The one or more computer-readable media of claim 12, wherein the first computer-readable media is to comprise a cache memory, wherein the control information is to comprise one or more tuples, wherein the classifications are to be based on a comparison of the one or more tuples to a tuple lookup data structure, wherein the comparison is to determine a match between the one or more tuples and a first entry of the tuple lookup data structure.

14. The one or more computer-readable media of claim 12, the plurality of computer-readable media comprising random access memory or a system memory.

15. The one or more computer-readable media of claim 12, with instructions to issue an allocating write to the first computer-readable media for the payload based on the classification of the payload, the first computer-readable media comprising a processor cache.

16. The one or more computer-readable media of claim 12, with instructions to issue a non-allocating write to the first computer-readable media for the payload based on the classification of the payload, the first computer-readable media comprising a processor cache.

17. The one or more computer-readable media of claim 12, with instructions to determine a priority for the information element based on QoS data generated using the control information, the priority comprising a high priority or a low priority.

18. The one or more computer-readable media of claim 17, with instructions to store the information element in a cache memory responsive to the information element having the high priority.

19. A system comprising:
a network device; and logic, at least a portion of the logic implemented by the network device, the logic to:
  receive, via the network device, an information element, the information element to include control information and a payload;
  separately classify each of the payload and the control information as one of a quality of service (QoS) traffic or a non-QoS traffic; and
  issue at least one write to one or more of a plurality of computer-readable media based on the classifications of the payload and the control information, the plurality of computer-readable media comprising a first computer-readable media and a second computer-readable media, the at least one write to comprise a first write to cause the payload to be written to the first computer-readable media based on the classification of the payload and a second write to cause the control information to be written to the second computer-readable media based on the classification of the control information.

20. The system of claim 19, the network device including a physical network device comprising one or more of a network interface controller (NIC), a field programmable gate array (FPGA), an application specific integrated circuit (ASIC), a system on a chip (SOC), a platform controller hub (PCH), a direct media interface (DMI), an ultrapath interconnect (UPI), a direct memory access (DMA) controller, a complex programmable logic device (CPLD) a microprocessor, a server, a network node, and a computer.

21. The system of claim 20, the physical network device to implement a virtual network device.

22. The system of claim 21, the virtual network device comprising one or more of a virtualized network function (VNF), a soft processor, a hypervisor, a virtual disk drive, and a virtual private network (VPN).

23. The system of claim 19, the logic to determine a priority for the information element based on QoS data generated using the control information, the priority comprising a high priority or a low priority.

24. The system of claim 23, the logic to store the information element in a cache memory responsive to the information element having the high priority.

* * * * *